Oct. 20, 1959  B. WALTERSCHEID-MÜLLER ET AL  2,909,047
OVERLOAD CLUTCH
Filed March 29, 1957                                    4 Sheets-Sheet 1

INVENTORS
BERNHARD WALTERSCHEID-MÜLLER
KURT SCHRÖTER

By  Taulmin & Taulmin

Attorneys

Oct. 20, 1959  B. WALTERSCHEID-MÜLLER ET AL  2,909,047
OVERLOAD CLUTCH
Filed March 29, 1957  4 Sheets-Sheet 2

INVENTOR
BERNHARD WALTERSCHEID-MÜLLER
KURT SCHRÖTER

BY Toulmin & Toulmin

ATTORNEYS

Oct. 20, 1959  B. WALTERSCHEID-MÜLLER ET AL  2,909,047
OVERLOAD CLUTCH
Filed March 29, 1957  4 Sheets-Sheet 3
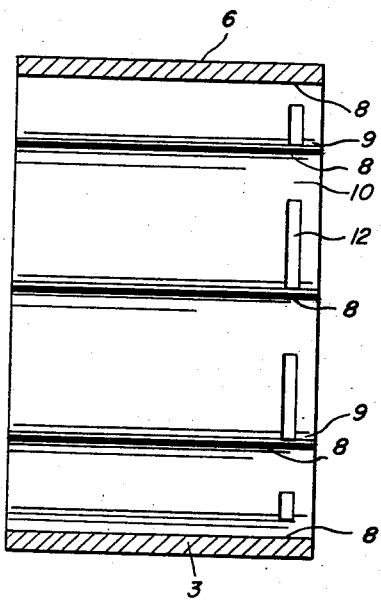
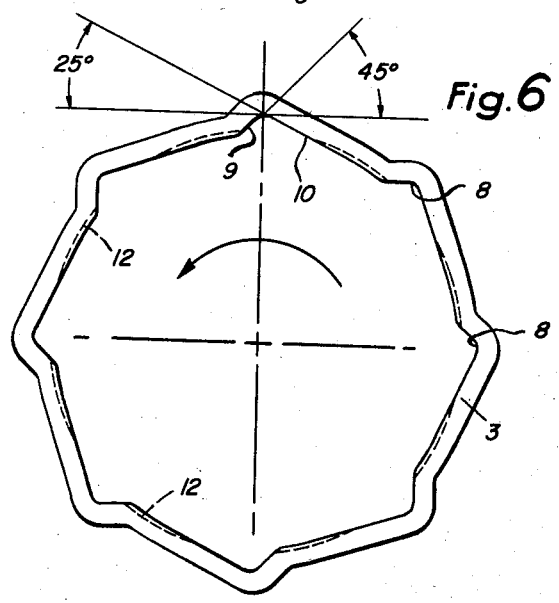
INVENTORS
BERNHARD WALTERSCHEID-MÜLLER
KURT SCHRÖTER
By Taulmin & Taulmin
Attorneys Oct. 20, 1959   B. WALTERSCHEID-MÜLLER ET AL   2,909,047
OVERLOAD CLUTCH
Filed March 29, 1957
4 Sheets-Sheet 4

INVENTORS
BERNHARD WALTERSCHEID-MÜLLER
KURT SCHRÖTER
By Toulmin & Toulmin
Attorneys

# United States Patent Office 2,909,047
Patented Oct. 20, 1959

2,909,047

OVERLOAD CLUTCH

Bernhard Walterscheid-Müller, Lohmar, and Kurt Schröter, Herkenrath b. Bergisch Gladbach, Germany Application March 29, 1957, Serial No. 649,495

Claims priority, application Germany June 29, 1956

7 Claims. (Cl. 64—29)

The present invention relates to an overload clutch, more particularly, to a clutch wherein the driven member has a tubular casing the inner wall surface of which has a plurality of cam-shaped elevations which are drivingly engaged by a plurality of dogs which are resiliently supported on the hub of the driving member which is received within said tubular casing.

It is the principal object of this invention to provide a novel and improved overload clutch.

It is another object of this invention to provide a less complicated and less expensive overload clutch which is especially adapted for agricultural machinery and the like.

It is a further object of this invention to provide an overload clutch wherein driving engagement is obtained through a plurality of resiliently mounted, radially arranged driving dogs.

It is an additional object of this invention to provide an overload clutch wherein the open end of the clutch casing is sealed by a plurality of annular rings which are closely received by the contours on the inner face of the casing.

It is still another object of this invention to provide an overload clutch which can be readily and economically manufactured by drawing a portion of the driven member so as to form contours thereon which are drivingly engaged by resiliently mounted portions of the driving member.

It is still a further object of this invention to provide an overload clutch having a thin wall of uniform thickness throughout to promote rapid dissipation of frictional heat produced on the casing during overloading of the clutch.

Additional objects and advantages of this invention will become apparent upon reference to the accompanying description when taken in conjunction with the following drawings wherein:

Figure 5 is a longitudinal sectional view of the casing of the driven member;

Figure 6 is a side elevational view of the casing illustrated in Figure 2 and illustrates the configuration of the surfaces of the casing;

Figure 1:
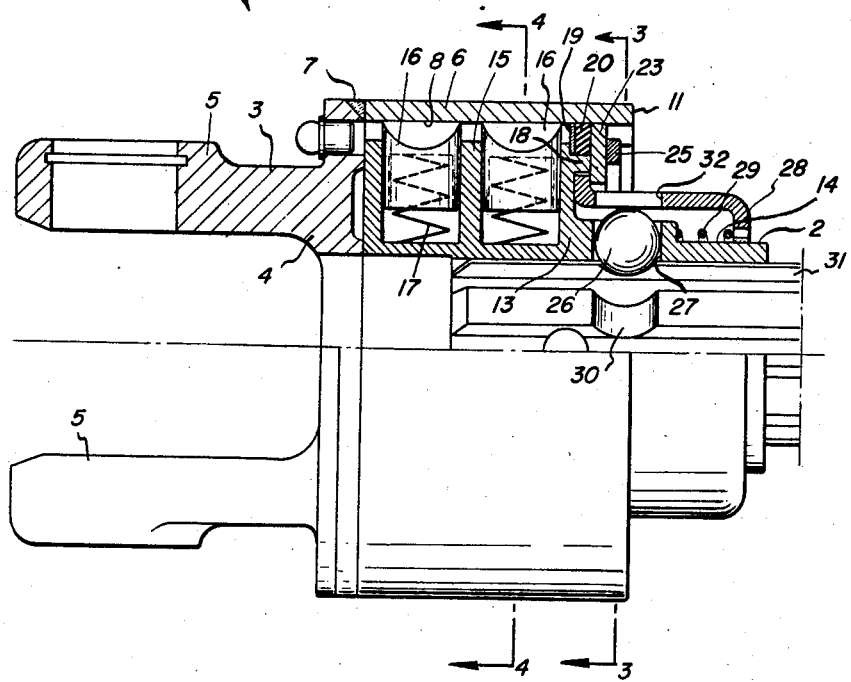
Figure 1 is a side elevational view with a portion thereof being shown in a longitudinal section of the overload clutch disclosed in this invention.
Figure 2:
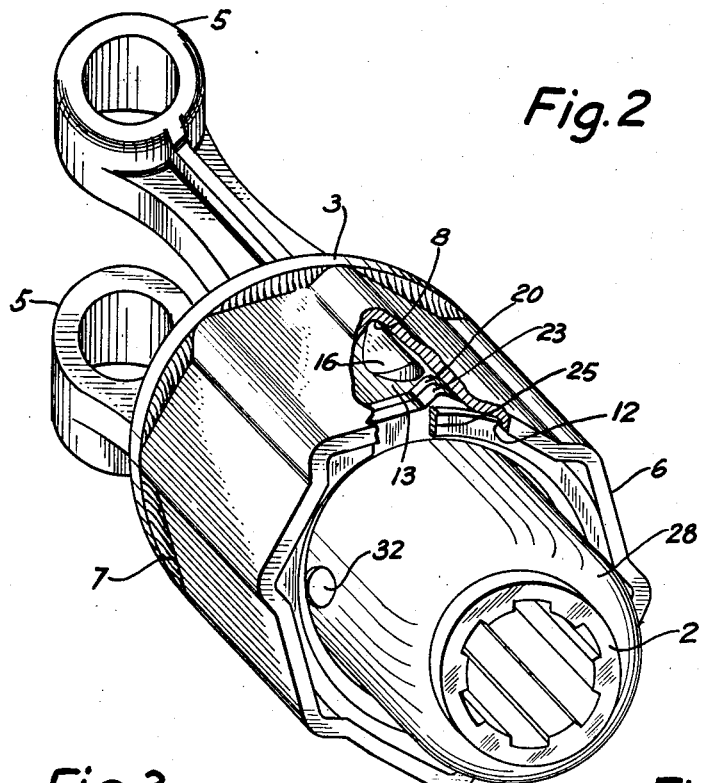
Figure 2 is an overall perspective view of the overload clutch with portions of the casing removed to show details thereof.
Figures 3, 4:
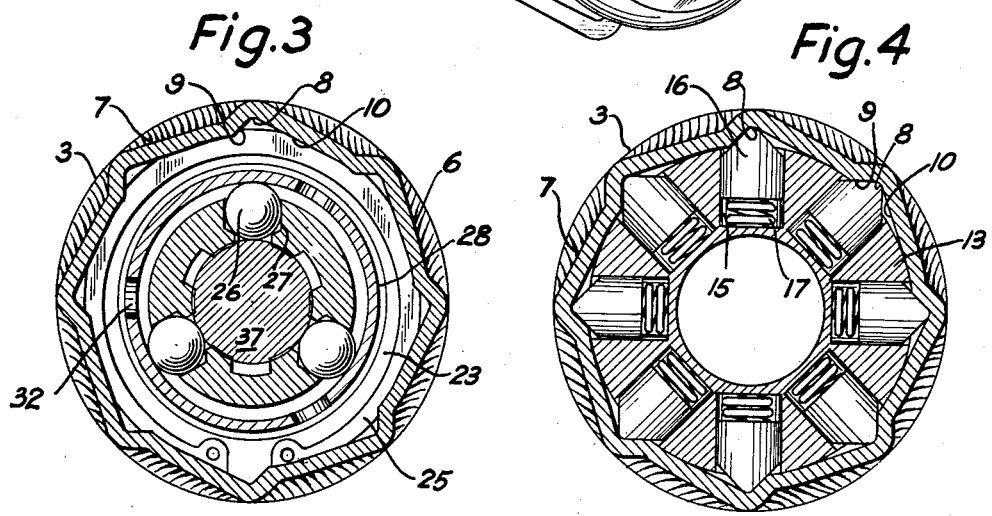
Figure 3 is a sectional view taken along the lines 3—3 of Figure 1.
Figure 4 is a sectional view taken along the lines 4—4 of Figure 1.

Returning now to the drawings, more particularly to Figure 1 where like reference symbols indicate the same parts throughout the various views, there is illustrated the overload clutch 1 of this invention which comprises a driving member 2 and a driven member 3.

The driven member comprises a body portion 4 which has a pair of axially extending arms 5 or forks for connection to a wheel or any other member to which it is desired to transmit power through the overload clutch. Axially extending from the other end of the body portion is a tubular casing 6 which is welded to the body portion at 7.

The casing 6 comprises a thin walled tubular member which is made from a low carbon case steel having a Rockwell hardness of 50–62. The casing has a uniform wall thickness of 4–5 mm. throughout and is formed by drawing.

Figure 7:
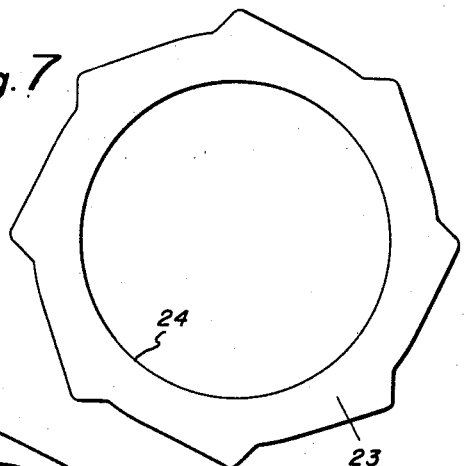
Figure 7 is a plan view of one of the annular rings which closes and seals the open end of the clutch casing.

As may be seen in Figure 6, the inner wall of the casing has a plurality of uniformly spaced, circumferentially arranged depressions or recesses 8. The side walls 9 and 10 of the depressions are inclined but have different angles of inclination. Side wall 9, which is in the direction of rotation of the driving member, has an angle of 45° with a radius of the clutch and has a somewhat greater inclination than the side wall 10 which is at an angle of 25° with a tangent of the clutch as seen in Figure 7. This results in a corrugated effect on the inner surface of the casing. In addition, the depressions receive driving dogs in the manner to be described with the driving dogs being biased against the steeper side walls 9 so as to drivingly engage the driven member through the casing.

It has been discovered that the use of these angles results in the most effective operation of this type of a clutch.

Adjacent the open end 11 of the casing is an annular groove 12 which passes through the raised portions of the inner surface of the casing as formed by the intersections of adjacent side walls 9 and 10.

The driving member 2 comprises a hub 13 extending from a body portion 14. The hub 13 is received within the open end of the casing so that the casing 6 extends over the entire portion of the hub 13 and a portion of the body 14. There are a plurality of pairs of recesses 15 uniformly spaced and circumferentially arranged in the driving member hub 13. The recesses 15 are so spaced as to cooperate with the depressions 8 in the casing of the driven member. There is a driving dog 16 in each of the driving member recesses. Springs 17 urge each of the driving dogs 16 outwardly into engagement with the casing.

Figure 8:
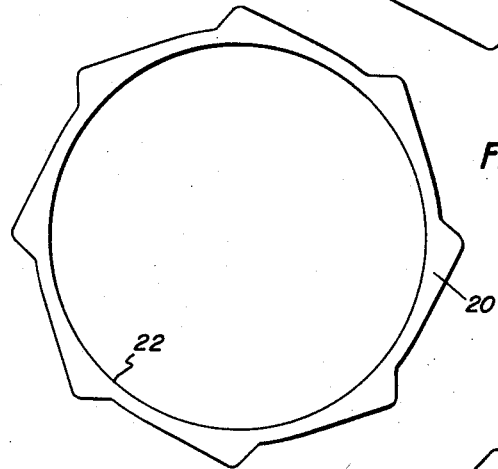
Figures 8 and 9 are plan views of additional annular packing rings which are also used to seal the open end of the clutch casing.
Figure 9:
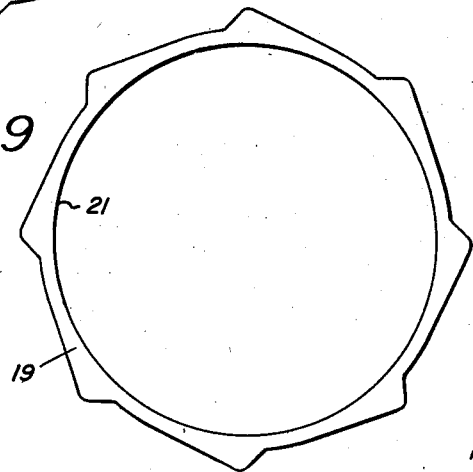

There is a shoulder 18 adjacent the end of the hub 13 which is proximate the open end 11 of the driven member casing. Mounted upon the shoulder 18 is a steel annular disk 19 as illustrated in Figure 9, and a resilient or elastic annular disk 20 as illustrated in Figure 8. The outer edges of the disks 19 and 20 are corrugated so as to closely conform to the configuration of the inner surface of the casing 6. The disks 19 and 20 have circular openings 21 and 22 therein which fit over the annular shoulder 18 on the driving member.

Another annular disk 23 which has a corrugated outer edge so as to closely fit within the driven member casing is mounted outwardly of the disks 19 and 20 and the annular shoulder 18. The disk 23 also has a circular inner opening 24 and this opening is of less diameter than the openings of the disks 19 and 20 to fit over the driving member body 14 and the rotary locking member to be presently described.

A resilient retaining ring 25 is inserted into the groove 12 and bears against the disk 23 so as to maintain the disks 19, 20 and 23 in their positions as described and to restrain them against axial movement. In this manner, the disks 19, 20 and 23 form a tight rotary seal between the driving and driven members of the clutch.

The retaining ring 25 and the annular ring 23 are preferably made of plastic so as to be substantially rigid but also resilient or elastic.

With this clutch, the driving and driven members will be constantly in driving engagement since the springs 17 will continuously urge the driving dogs 16 into engagement with the depressions 8. However, the springs 17 are so selected as to permit a predetermined torque to be transmitted by the driving member through the driving dogs to the driven member. In the event that this predetermined torque is exceeded, the driving dogs 16 will be cammed up and over the side walls 9 of the depressions 8 and will be disengaged from the depressions of the driven member. As long as this predetermined torque is exceeded the driving dogs will continue to ride over the inclined side walls of the depressions so that the overload clutch will operate as a free wheeling device when the driven member rotates faster than the driving member. This overload condition will generate tremendous amounts of frictional heat because of the movement of the driving dogs against the inner face of the casing. However, the thin wall construction of the casing will permit the ready dissipation of the heat therethrough. Also, the corrugated outer surface of the casing will present a greater surface to the atmosphere and will allow for greater ventilation and considerably faster cooling of the driven casing.

Immediately upon the reduction of the torque transmitted by the driving member to a quantity below the predetermined torque, the driving dogs 17 will become lodged in the depressions 8 against the steeply-inclined side walls 9. In this normal driving position, torque will again be continuously transmitted through the driving member to the driven member.

The clutch of this invention is axially secured to a spline shaft by three balls 26 received in opening 27 in the body portion 14. The balls 26 are moved radially inwardly by rotating a cylindrical member 28 mounted on the body member portion 14 and spring biased outwardly by a spring 29 to engage an annular groove 30 in the spline shaft 31. The cylindrical member 28 has three equally spaced openings 32 therein. These openings 32 are of sufficient size to enable a portion of the balls 27 to move therein so as to become disengaged from the annular groove. However, the holes are smaller in diameter than the diameter of the balls to prevent the balls from falling out of the body 14.

The clutch is disconnected from the spline shaft merely by rotating the cylindrical member 28 in such a direction that the balls are received in the openings 32 thereof.

Thus, it can be seen that the present invention provides a free wheeling overload clutch which is extremely simple in operation and which may be economically manufactured. The casing can be readily drawn to have a configuration as illustrated in Figures 5 and 6. At only a slight additional cost, the casing can be drawn in the required configuration with sufficient accuracy to result in a smoothly operating clutch. In addition, the sealing of the open side of the casing with the said annular rings which match the profile of the casing and are retained in position by an elastic retaining ring results in a reliable rotary seal and assures a simple assembly of the clutch.

While the driven member comprising the body portion, the arms and the casing may be made of one piece, the construction may be considerably simplified and undertaken with less expense by making the tubular casing individually and by welding one end of the casing to the driven member, as described. The use and economy of manufacture and assembly, together with the excellent cooling characteristics obtained by the undulating outer surface of the casing will result in a simplified overload clutch which is adapted for many uses including agricultural machinery and the like.

As an example of the size and effectiveness of the clutch of this invention, a working model thereof has been constructed which has a torque capacity of 10 to 100 meter kilograms. This clutch has an overall diameter of 96 millimeters and measures 128 millimeters from the center line of the openings in the arms 5 to the extreme portion of the body 14 of the driving member.

Another illuminating dimension is the length of 102 millimeters from the same center line to the end of the casing 6.

In operation, this model of the clutch performed satisfactorily and no cooling problems whatsoever were encountered. By visualizing the size of the clutch of this invention with respect to its torque capacity, it can be appreciated that this clutch is a highly effective mechanism with respect to its size.

It will be understood that this invention is susceptible to modification in order to adapt it to different usages and conditions, and, accordingly, it is desired to comprehend such modifications within this invention as may fall within the scope of the appended claims.

What is claimed is:

1. In an overload cltuch, a driving member having a hub, a driven member having a casing extending over said hub, there being longitudinally extending corrugations in the wall of said casing extending over said hub, each of said corrugations in the wall of said casing having inclined side walls of different angles of inclination with the greater angle being in the direction of rotation of the driving member, said hub having a plurality of radially extending recesses on the surface thereof, a plurality of driving dogs slidably received in said recesses and engageable with said corrugations, and spring means urging said driving dogs outwardly into driving engagement with said corrugations whereby the exceeding of the maximum torque transmittable by said spring means will cause said driving dogs to ride up said inclined side walls and to disengage the driving member from the driven member, the inclined walls of said corrugations of the lesser angle riding over said driving dogs when the driven member rotates at a speed greater than that of said driving member so that the overload clutch may operate as a free wheeling device.

2. In an overload clutch, a driving member having a hub, a driven member having a thin wall tubular casing having a uniform wall thickness extending over said hub, there being longitudinally extending corrugations in said tubular casing and having inclined side walls at different angles of inclination with the greater angle being in the direction of rotation of the driving member, a plurality of radially extending driving means on said hub and engageable with said depressions, and spring means urging said driving means outwardly into driving engagement with said depressions, the inclined walls of said corrugations of the lesser angle riding over said driving dogs when the driven member rotates at a speed greater than that of said driving member so that the overload clutch may operate as a free wheeling device.

3. In an overload clutch, a driving member having a hub, a driven member having a drawn casing with a uniform wall thickness extending over said hub, there being a plurality of uniformly spaced circumferentially arranged corrugations in said casing and having inclined side walls at different angles of inclination with the greater angle being in the direction of rotation of the driving member, a plurality of radially extending driving dogs on said hub and engageable with said depressions, and spring means urging said driving dogs outwardly into driving engagement with said corrugations, the inclined walls of said corrugations of the lesser angle riding over said driving dogs when the driven member rotates at a speed greater than that of said driving member so that the overload clutch may operate as a free wheeling device.

4. In an overload clutch, a driving member having a hub, a driven member having a tubular casing extending therefrom with one end of said casing being open, the open end of said casing receiving said driving member whereby said casing extends over said hub, a plurality of coaxial annular rings mounted in the open end of said casing to sealingly close said tubular casing with respect to said driving member, there being a plurality of corrugations in said tubular member and having inclined side walls of different angles of inclination with the greater angle being in the direction of rotation of the driving member, a plurality of radially extending dogs on said hub and engageable with said corrugations, and spring means urging said dogs outwardly into driving engagement with said corrugations whereby said dogs will ride up said greater inclined side wall to disengage said driving and driven members when a predetermined torque is exceeded, the inclined walls of said corrugations of the lesser angle riding over said driving dogs when the driven member rotates at a speed greater than that of said driving member so that the overload clutch may operate as a free wheeling device.

5. In an overload clutch as claimed in claim 4, with each of said annular rings having its outer edge shaped to be closely received within said tubular casing and its inner edge being circular.

6. In an overload clutch, a driving member having a hub, a driven member having a thin walled tubular casing extending therefrom with the outer end of said casing being open, the open end of said casing receiving said driving member whereby said tubular casing extends over said hub, there being corrugations on the inner surface of said tubular casings whereby adjacent surfaces of said corrugations are inclined at different angles to form depressions therebetween, a plurality of radially extending dogs on said hub and engageable with said depressions, springs urging each of said dogs outwardly into driving engagement with said depressions whereby said dogs are disengageable from said driven member by riding up and over said inclined surfaces when said driving member transmits a torque which exceeds a predetermined torque for which springs were selected, there being an annular groove through the lower portion of said corrugations and adjacent the outer end of said tubular casing, a plurality of annular rings for sealingly closing said tubular casing and said driving member, one of said annular rings being of elastic material, and a retaining ring inserted into said annular groove for restraining said annular rings against axial movement and maintaining said annular rings in sealing engagement between said casing of the driven member and said driving member.

7. In an overload clutch, a driving member having a hub, a driven member having a tubular casing extending therefrom with one end of said casing being open, the open end of said casing receiving said driving member whereby said casing extends over said hub, there being a plurality of corrugations in said tubular member having inclined side walls at different angles of inclination with the greatest angle being in the direction of rotation of the driving member, a plurality of radially extending dogs in said hub in engagement with said corrugations, spring means urging said dogs outwardly into driving engagement with said corrugations whereby said dogs will ride up said steeper inclined side walls to disengage said driving and driven member when a predetermined torque is exceeded, there being an annular groove in the portion of the inner surface of said tubular casing between said corrugations extending over said hub, a plurality of coaxial annular rings mounted in said annular groove to sealingly close said tubular casing with respect to said driving member, and a retaining ring inserted into said groove to restrain said annular rings against axial movement.

References Cited in the file of this patent

UNITED STATES PATENTS

| 680,170 | Oldfield et al. | Aug. 6, 1901 |
| 2,271,060 | Case | Jan. 27, 1942 |

FOREIGN PATENTS

| 15,816 | Great Britain | Nov. 9, 1915 |
| 431,875 | Great Britain | July 17, 1925 |
| 580,209 | France | Nov. 3, 1924 |